(12) United States Patent
Tajiri

(10) Patent No.: US 8,554,819 B2
(45) Date of Patent: Oct. 8, 2013

(54) SYSTEM TO IMPLEMENT FLOATING POINT ADDER USING MANTISSA, ROUNDING, AND NORMALIZATION

(75) Inventor: Kunihiko Tajiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 761 days.

(21) Appl. No.: 12/461,338

(22) Filed: Aug. 7, 2009

(65) Prior Publication Data

US 2009/0300087 A1  Dec. 3, 2009

Related U.S. Application Data

(63) Continuation of application No. PCT/JP2007/052396, filed on Feb. 9, 2007.

(51) Int. Cl.
*G06F 7/485* (2006.01)

(52) U.S. Cl.
USPC ........... 708/505; 708/497; 708/496; 708/495; 708/205

(58) Field of Classification Search
None
See application file for complete search history.

(56) References Cited

U.S. PATENT DOCUMENTS

| | | | | |
|---|---|---|---|---|
| 5,200,916 | A | * | 4/1993 | Yoshida ................... 708/505 |
| 5,204,825 | A |   | 4/1993 | Ng |
| 5,373,461 | A | * | 12/1994 | Bearden et al. ............ 708/505 |
| 6,085,212 | A | * | 7/2000 | Oberman ................... 708/505 |
| 6,275,839 | B1 | * | 8/2001 | Gerwig et al. ............. 708/505 |
| 6,557,021 | B1 |   | 4/2003 | Brooks et al. |
| 6,963,896 | B2 | * | 11/2005 | Purcell ..................... 708/505 |
| 7,552,165 | B2 | * | 6/2009 | Purcell ..................... 708/505 |
| 7,720,898 | B2 | * | 5/2010 | Driker et al. ............... 708/497 |
| 7,720,899 | B2 | * | 5/2010 | Tajiri ....................... 708/497 |
| 8,069,200 | B2 | * | 11/2011 | Landers et al. ............ 708/501 |
| 2003/0131036 | A1 |   | 7/2003 | Purcell |

FOREIGN PATENT DOCUMENTS

| | | |
|---|---|---|
| JP | 6-95851 | 4/1994 |
| JP | 10-40078 | 2/1998 |
| JP | 2005-134965 | 5/2005 |

OTHER PUBLICATIONS

International Search Report for PCT/JP2007/052396, mailed Mar. 6, 2007.

European Search Report dated Jun. 24, 2011 in corresponding European Patent Application 07714008.5.

* cited by examiner

*Primary Examiner* — Tammara Peyton
(74) *Attorney, Agent, or Firm* — Staas & Halsey LLP

(57) ABSTRACT

A computation processor outputs whether a carry-out is generated, by incrementing a result of computation by 1, during rounding of the result of the computation. The computation processor includes a computing unit that performs the computation; a shift amount calculating unit that calculates a shift amount of the result of the computation; a normalizing unit that performs normalization of the result of the computation, by using the shift amount; a predicting unit that, when the result of the computation is shifted by an amount equal to or more than a predetermined shift amount by using the shift amount, predicts whether each of bits in a predetermined region of a shift result is 1, in parallel with the normalization; and a detecting unit that detects a generation of the carry-out, by receiving a normalized result from the normalizing unit and a predicted result from the predicting unit.

5 Claims, 14 Drawing Sheets

FIG.11
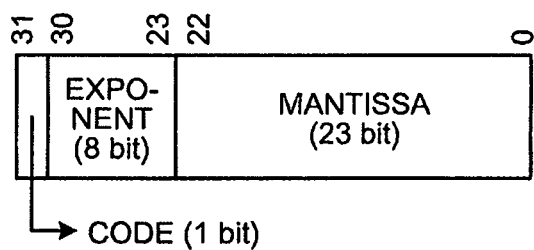
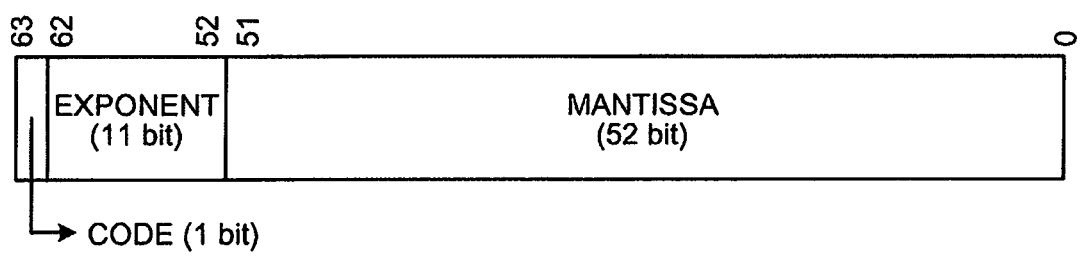

SYSTEM TO IMPLEMENT FLOATING POINT ADDER USING MANTISSA, ROUNDING, AND NORMALIZATION

CROSS-REFERENCE TO RELATED APPLICATION(S)

This application is a continuation of PCT international application Ser. No. PCT/JP2007/52396 filed on Feb. 9, 2007 which designates the United States, the entire contents of which are incorporated herein by reference.

FIELD

The embodiments discussed herein are directed to a computation processor that outputs whether a carry-out is generated, by incrementing a computation result by 1, during rounding of the computation result, an information processor, and a computing method.

BACKGROUND

Conventionally, when floating point numbers are added or subtracted, or multiplied and accumulated, the mantissas of operands, which are objects to be computed, are aligned, and the computation result is normalized and rounded. More specifically, for example, two operands OP1 and OP2 are aligned by shifting one of them to the right, and after the computation, left shifting is performed to remove the leading zeros continuously aligned before the beginning of the computation result. The computation result normalized by being shifted to the left is rounded to the number of digits that meets, for example, Institute of Electrical and Electronics Engineers (IEEE) 754 standards.

At this time, the left shift normalization is performed to remove the leading zeros. However, because the shift amount is determined after the computation result is obtained, the processing delay becomes large. Accordingly, in recent years, as disclosed in Japanese Laid-open Patent Publication No. 10-40078, for example, a shift amount is predicted in parallel with the computation performed by an adder and the like. Consequently, the computation result can be normalized as soon as it is calculated.

FIG. 13 is a block diagram of a structure of a processing unit for the mantissa, which is a part of a computation processor used to predict the left shift amount such as the above. The computation processor depicted in the diagram includes a right shifter 10, an absolute value adder 20, a leading zero predictor (hereinafter, referred to as "LZ predictor") 30, a left shifter 40, and a rounding unit 50.

When the right shifter 10 receives an operand OP1, the right shifter 10 shifts the operand OP1 to the right so that the operand OP1 is aligned to the operand OP2. The right shifter 10 obtains a shift amount from a processing unit that processes an exponent, which is not depicted.

The absolute value adder 20 adds absolute values of the operand OP1 shifted to the right by the right shifter 10 and the operand OP2. The LZ predictor 30 predicts the number of leading zeros continuously aligned before the beginning of the computation result, obtained by having the absolute values added by the absolute value adder 20. The LZ predictor 30 then outputs the number of digits obtained by prediction to the left shifter 40 as a left shift amount.

The left shifter 40 shifts the addition result of the absolute values to the left, by the left shift amount output from the LZ predictor 30, and performs normalization by removing the leading zeros and making the first bit of the computation result to 1. In other words, for example, as depicted in FIG. 14, if zeros are continuously aligned before the beginning of the computation result of 125 bits, the left shifter 40 shifts a bit string of the computation result to the left, so that the first digit of the computation result is 1.

The rounding unit 50 outputs the processing result, by making the normalized computation result to the number of digits that meets, for example, IEEE 754 standards. At this time, for example, in a single-precision floating point format in which the mantissa is defined to be 23 bits, the rounding unit 50 determines whether 1 is added (incremented) to a portion of 23-bit mantissa, based on the 24th bit and subsequent bits of the computation result, and adds 1 as necessary. Consequently, the same process as that of the rounding of decimal numbers is also performed on binary floating point numbers.

When an increment is performed during rounding, if each of the bits in the mantissa is 1, a carry-out is generated, thereby adding 1 to the exponent. In other words, in the rounding unit 50 depicted in FIG. 13, when 1 is added to the mantissa of the processing result, a carry-out is generated, if each of the bits in the mantissa is 1. Accordingly, adding 1 to the computation result of the exponent is needed, which is not depicted.

Consequently, the computation result of the exponent cannot be obtained until the rounding unit 50 completes the rounding, thereby limiting the speed of computation to a certain level. In particular, in the IEEE 754, the mantissa is 23 bits in the single-precision floating point format, and the mantissa is 52 bits in a double-precision floating point format. Accordingly, in the rounding unit 50, 1 is added to the bit width of the mantissas, and the computation result of the exponent cannot be obtained until the result is calculated. More specifically, a carry-out is generated by incrementing in the rounding unit 50, when each of the 23 bits or the 52 bits is 1. Consequently, the delay caused by the AND operation on the 23 bits or the 52 bits occurs after the normalization.

When parity bits for error correction are calculated by a predetermined bit width for floating point format data, for example, if the acquisition of the computation result of the exponent is eventually delayed, not only the parity bits of the exponent, but the calculation on the parity bits of a portion that stretches over the exponent and the mantissa is delayed. Accordingly, the total processing delay is further increased. Such a problem occurs not only in a computation processor for adding or subtracting as depicted in FIG. 13, but also occurs similarly in a computation processor in which normalization and rounding are performed, such as a computation processor for multiplying and accumulating.

SUMMARY

According to an aspect of the invention, a computation processor outputs whether a carry-out is generated, by incrementing a result of computation by 1, during rounding of the result of the computation. The computation processor includes a computing unit that performs the computation; a shift amount calculating unit that calculates a shift amount of the result of the computation; a normalizing unit that performs normalization of the result of the computation, by using the shift amount; a predicting unit that, when the result of the computation is shifted by an amount equal to or more than a predetermined shift amount by using the shift amount, predicts whether each of bits in a predetermined region of a shift result is 1, in parallel with the normalization; and a detecting unit that detects a generation of the carry-out, by receiving a normalized result from the normalizing unit and a predicted result from the predicting unit.

According to another aspect of an embodiment, a computation processor outputs whether a carry-out is generated, by incrementing a mantissa of a result of floating point computation by 1, during rounding of the result of the floating point computation. The computation processor includes a computing unit that performs the floating point computation; a shift amount calculating unit that calculates a shift amount of the result of the floating point computation obtained by the computing unit; a normalizing unit that includes a plurality of shifting units, and that, by using the shift amount, performs normalization of the result of the floating point computation, by performing a stepwise shift using the shifting units; a predicting unit that, by using the shift amount, predicts whether each of bits of shifted results of a first region remaining in the mantissa by being shifted by an amount equal to or more than a predetermined shift amount, and of a second region shifted to the mantissa by being shifted by the amount equal to or more than the predetermined shift amount, is 1, in the normalization; and a detecting unit that detects a generation of the carry-out, by receiving a third region remaining in the mantissa by being shifted by less than the predetermined shift amount in a result of the normalization obtained by the normalizing unit, a fourth region shifted to the mantissa by being shifted by less than the predetermined shift amount in the result of the normalization obtained by the normalizing unit, and a predicted result obtained by the predicting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 11 is a schematic of a floating point format;

DESCRIPTION OF EMBODIMENT(S)

Preferred embodiments according to the present invention are described below in detail with reference to the accompanying drawings. In the following, normalization is performed by shifting to the left. However, the present invention may also be applied to the right shift.

[a] First Embodiment

Figure 1:
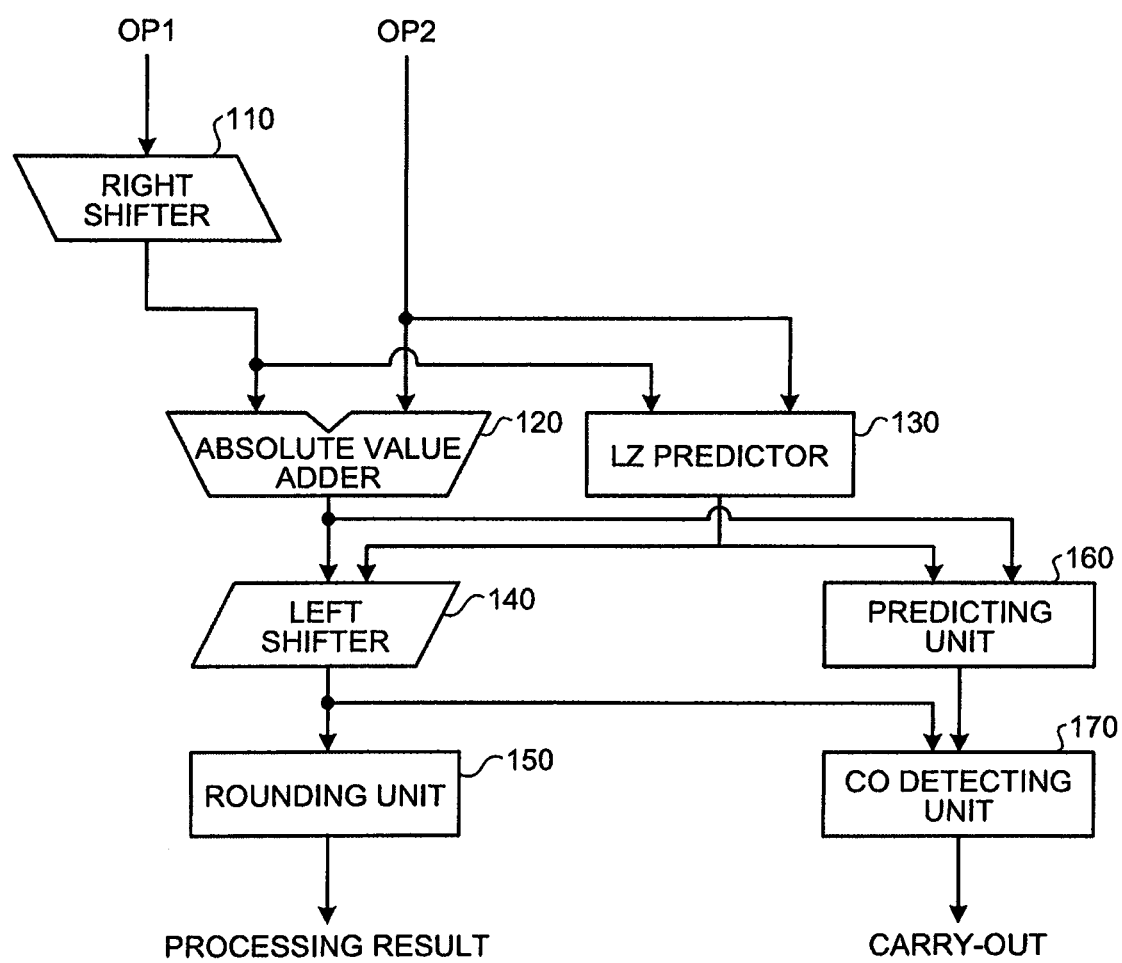
FIG. 1 is a block diagram of a key portion of a computation processor according to a first embodiment.

FIG. 1 is a block diagram of a key portion of a computation processor according to a first embodiment of the present invention. In the diagram, a processing unit that processes the mantissa of a floating point number is depicted. The computation processor depicted in FIG. 1 includes a right shifter 110, an absolute value adder 120, a leading zero (LZ) predictor 130, a left shifter 140, a rounding unit 150, a predicting unit 160, and a carry-out detecting unit (hereinafter, referred to as "CO detecting unit") 170.

The right shifter 110, on receiving an operand OP1, shifts the operand OP1 to the right, so that the operand OP1 is aligned to an operand OP2. The right shifter 10 obtains a shift amount from a processing unit that processes an exponent, which is not depicted. In other words, the right shifter 10 obtains a shift amount needed to match the exponents of the operand OP1 and the operand OP2, and shifts the operand OP1 to the right by the obtained shift amount. Accordingly, the operand OP1 and the operand OP2 can be added or subtracted.

The absolute value adder 120 adds absolute values of the operand OP1 shifted to the right by the right shifter 110 and the operand OP2. In the present embodiment, the number of bits of the addition result obtained by the absolute value adder 120 is 64 bits, and a bit string of the addition result is indicated by "D (x:y)". X is the first bit position and y is the last bit position. Accordingly, for example, the whole addition result obtained by the absolute value adder 120 is indicated by "D (63:0)".

The LZ predictor 130 predicts the number of leading zeros continuously aligned before the beginning of the computation result of the absolute value addition obtained by the absolute value adder 120, and outputs the number of digits obtained by prediction to the left shifter 140 and the predicting unit 160 as a left shift amount. In the present embodiment, the left shift amount that may be generated at the most is within 63 bits, and a bit string that expresses the left shift amount is indicated by "SA (x:y)". X is the first bit position and y is the last bit position. Because the maximum left shift amount is 63 bits, the left shift amount can be expressed by a bit string of six bits (because it is $2^5 < 63 < 2^6$). Consequently, "SA (5:0)" is output from the LZ predictor 130 to the left shifter 140 and the predicting unit 160.

The left shifter 140 shifts the absolute value addition result to the left, by the left shift amount output from the LZ predictor 130, and performs normalization by removing the leading zeros, and setting the first bit of the computation result to 1. In the present embodiment, a bit string normalized by the left shifter 140 is indicated by "R (x:y)". X is the first bit position and y is the last bit position. Accordingly, if a rounding region, which is an object rounded by the rounding unit 150, is 32 bits from the first bit of the normalized bit string, the bit string is indicated by "R (63:32)".

Figure 2:
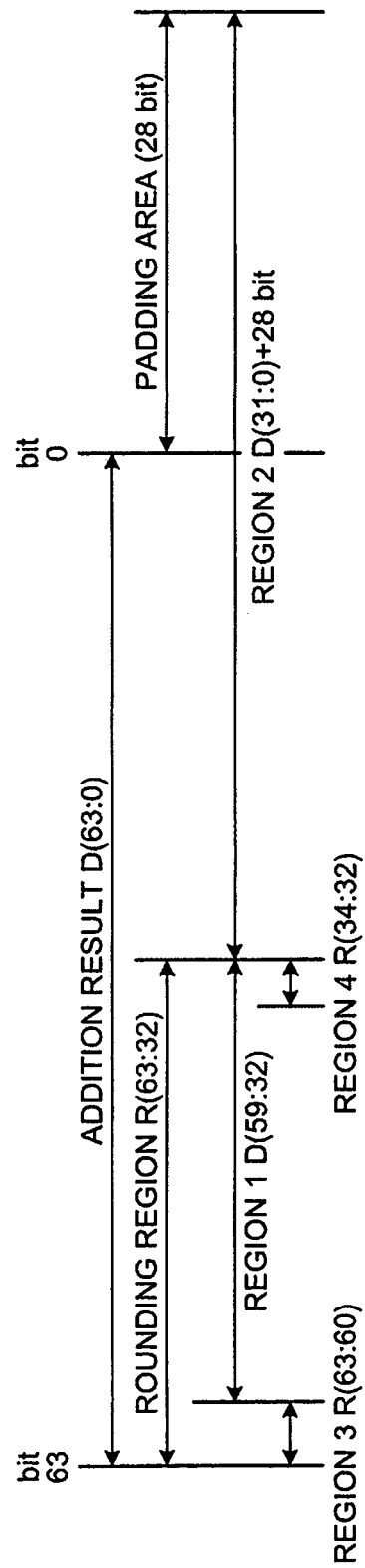
FIG. 2 is a schematic of a region of bit positions according to the first embodiment.

The bit positions in the present embodiment are as depicted in FIG. 2. In other words, if D (63:0), which is the addition result obtained by the absolute value adder 120, is referred to, the rounding region after being normalized by the left shifter 140 is indicated by R (63:32). In the present embodiment, regions 1 to 4 are set to predict whether a carry-out is generated during rounding. More specifically, the region 1 is D (59:32) in which the highest-order four bits are removed from the high-order 32 bits of the addition result D (63:0). The region 2 is a region in which the low-order 32 bits of D (31:0) of the addition result D (63:0) and a padding area of 28 bits are combined. The padding area is an area that shiftable to the rounding region R (63:32) by the normalization performed by the left shifter 140, and each of the bits therein is 0.

The region 3 is the high-order four bits R (63:60) of the normalized rounding region R (63:32), and the region 4 is the low-order three bits R (34:32) of the normalized rounding region R (63:32). In the present embodiment, the shift amount given in four bits is indicated by SA (5:2), in the left shift amount SA (5:0) output from the LZ predictor 130. Accordingly, the shift amount equal to or more than four bits can be identified from the SA (5:2), and the region 3 and the region 4 may be regions corresponding to the shift amount less than four bits. However, to make the number of bits in the region 1 to the multiples of four (28 bit), the region 3 is four bits.

Such a region is used to predict the generation of a carry-out. In other words, whether the region 1 is remained in the rounding region R (63:32) after being normalized is determined, and whether the region 2 is shifted to the rounding region R (63:32) after being normalized is determined. If each of the bits of region 1 and region 2 judged to be included in the rounding region R (63:32) is 1, and if each of the bits in the regions 3 and 4 is 1, and if each of the bits in the region 3 and the region 4 is 1, each of the bits in the rounding region R (63:32) is 1. Accordingly, a carry-out is generated by incrementing during rounding.

Figure 3:
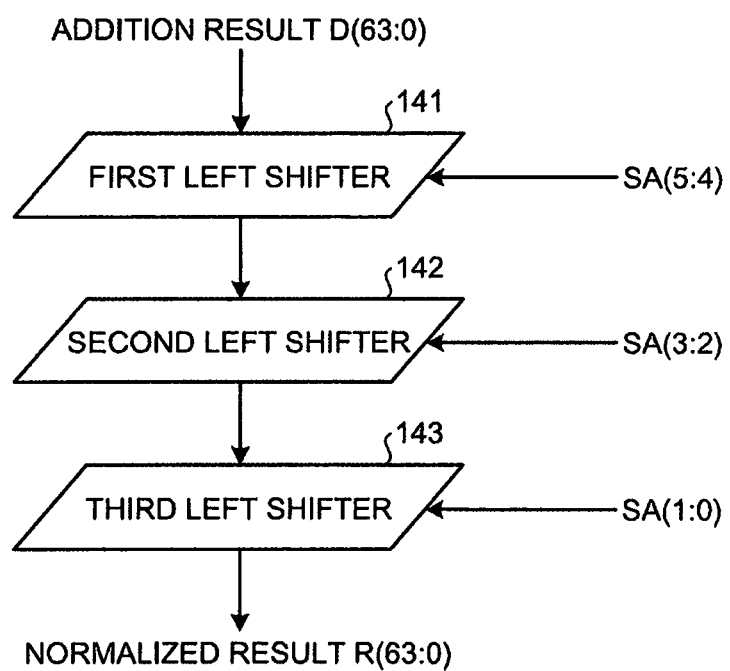
FIG. 3 is a block diagram of an internal configuration of a left shifter according to the first embodiment.

The left shifter 140, for example, has a multi-stage structure as depicted in FIG. 3, and includes a first left shifter 141 that shifts the addition result D (63:0) by 16 bits, a second left shifter 142 that shifts the addition result D (63:0) by four bits, and a third left shifter 143 that shifts the addition result D (63:0) by one bit.

The first left shifter 141 performs a shift by zero bit, 16 bits, 32 bits, or 48 bits, based on the high-order two bits SA (5:4) of the left shift amount output from the LZ predictor 130. More specifically, the first left shifter 141 performs a shift by zero bit when the SA (5:4) is (0, 0), performs a shift by 16 bits when the SA (5:4) is (0, 1), performs a shift by 32 bits when the SA (5:4) is (1, 0), and performs a shift by 48 bits when the SA (5:4) is (1, 1). In other words, the first left shifter 141 performs a left shift at a 16(=$4^2$)-bit width.

The second left shifter 142 performs a shift by zero bit, four bits, eight bits, or 12 bits, based on the middle two bits SA (3:2) of the left shift amount. More specifically, the second left shifter 142 performs a shift by zero bit when the SA (3:2) is (0, 0), performs a shift by four bits when the SA (3:2) is (0, 1), performs a shift by eight bits when the SA (3:2) is (1, 0), and performs a shift by 12 bits when the SA (3:2) is (1, 1). In other words, the second left shifter 142 performs a left shift at a 4(=$4^1$)-bit width.

The third left shifter 143 performs a shift by zero bit, one bit, two bits, or three bits, based on the low-order two bits SA (1:0) of the left shift amount. More specifically, the third left shifter 143 performs a shift by zero bit when the SA (1:0) is (0, 0), performs a shift by one bit when the SA (1:0) is (0, 1), performs a shift by two bits when the SA (1:0) is (1, 0), and performs a shift by three bits when the SA (1:0) is (1, 1). In other words, the third left shifter 143 performs a left shift at a 1(=$4^0$)-bit width.

The left shifter 140 shifts the addition result D (63:0) by 63 bits at the most and outputs the normalized result R (63:0), by combining the shifts performed by the first to the third left shifters 141 to 143 as described above. In the present embodiment, each of the first to the third left shifters 141 to 143 perform the left shifts at a bit width of $4^n$. However, the first to the third left shifters 141 to 143 may also perform the left shifts at a bit width of the nth power of an integer other than four.

The rounding unit 150 performs rounding on the normalized result R (63:0) to the number of digits that meets, for example, IEEE 754 standards, and output the processing result. In the present embodiment, the rounding unit 150 performs rounding on the rounding region R (63:32) of 32 bits, and outputs the processing result corresponding to the mantissa of the floating point number.

The predicting unit 160 predicts whether each block of four bits that forms the region 1 and the region 2 is included in the rounding region R (63:32) after being normalized by the left shifter 140. The predicting unit 160 then outputs the predicted result that indicates whether each of the bits included in the rounding region R (63:32) is 1. The predicting unit 160 will be described later.

The CO detecting unit 170 detects the generation of a carry-out during the rounding performed by the rounding unit 150, by using the predicted result obtained by the predicting unit 160 and a part of bits of the normalized result R (63:0) obtained by the left shifter 140. If the carry-out is generated, the CO detecting unit 170 outputs 1 to the processing unit that processes an exponent, which is not depicted, as a carry-out. The CO detecting unit 170 will be described later.

Figure 4:
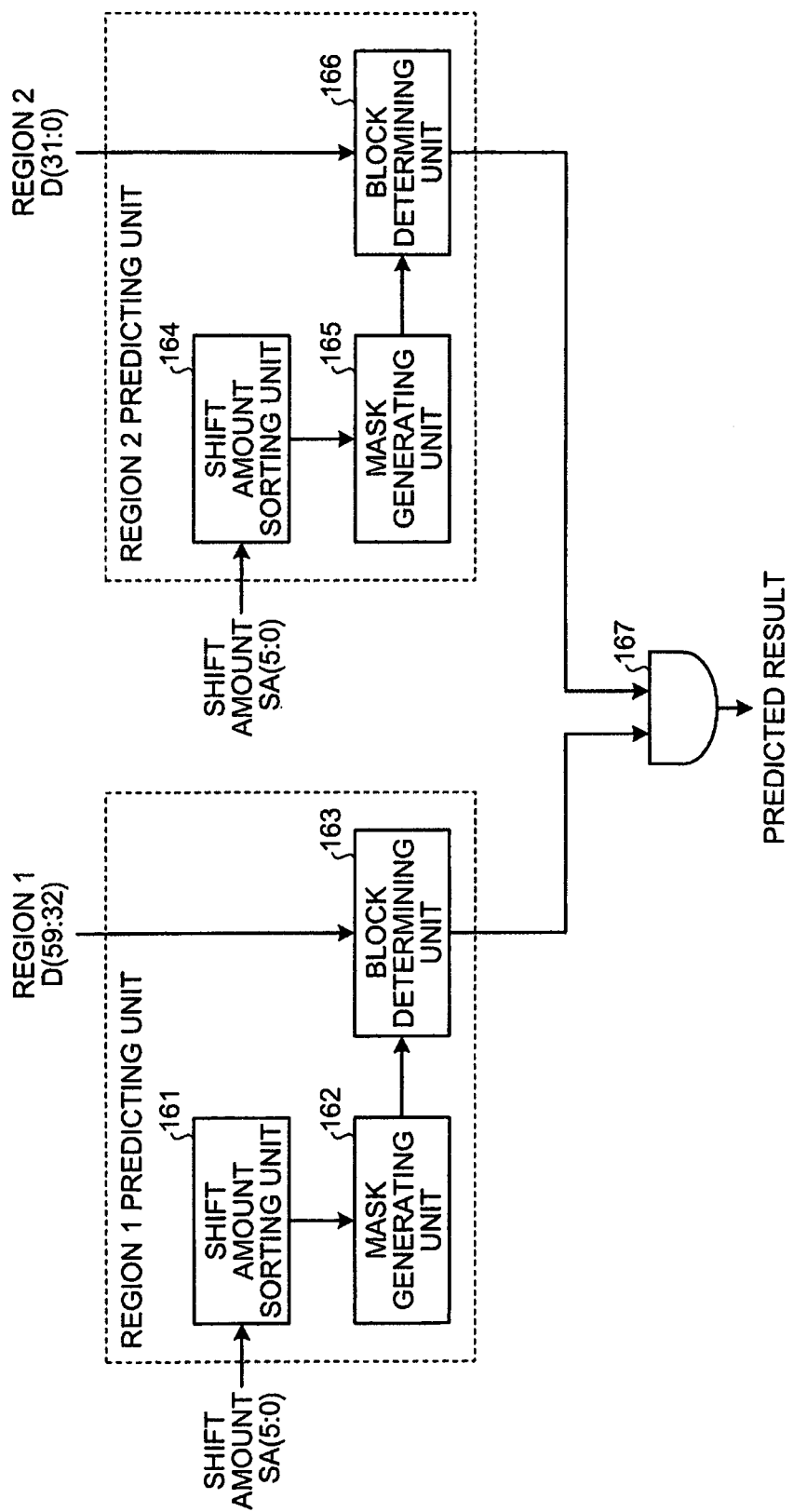
FIG. 4 is a block diagram of an internal configuration of a predicting unit according to the first embodiment.

An internal configuration and an operation of the predicting unit 160 will now be described with reference to FIGS. 4 to 8. FIG. 4 is a block diagram of the internal configuration of the predicting unit 160. The predicting unit 160 depicted in the diagram includes a region 1 predicting unit having a shift amount sorting unit 161, a mask generating unit 162, and a block determining unit 163, a region 2 predicting unit having a shift amount sorting unit 164, a mask generating unit 165, and a block determining unit 166, and an AND gate 167.

The shift amount sorting unit 161 sorts out the shift amounts specified by the first left shifter 141 and the second left shifter 142, by using the high-order four bits of the left shift amount SA (5:0) output from the LZ predictor 130. In other words, the shift amount sorting unit 161 detects whether the left shifts by 16 bits or more, 32 bits or more, and 48 bits are performed by the first left shifter 141 from the SA (5:4), while detecting whether the left shifts by four bits or more, eight bits or more, and 12 bits are performed by the second left shifter 142 from the SA (3:2).

Figure 5:
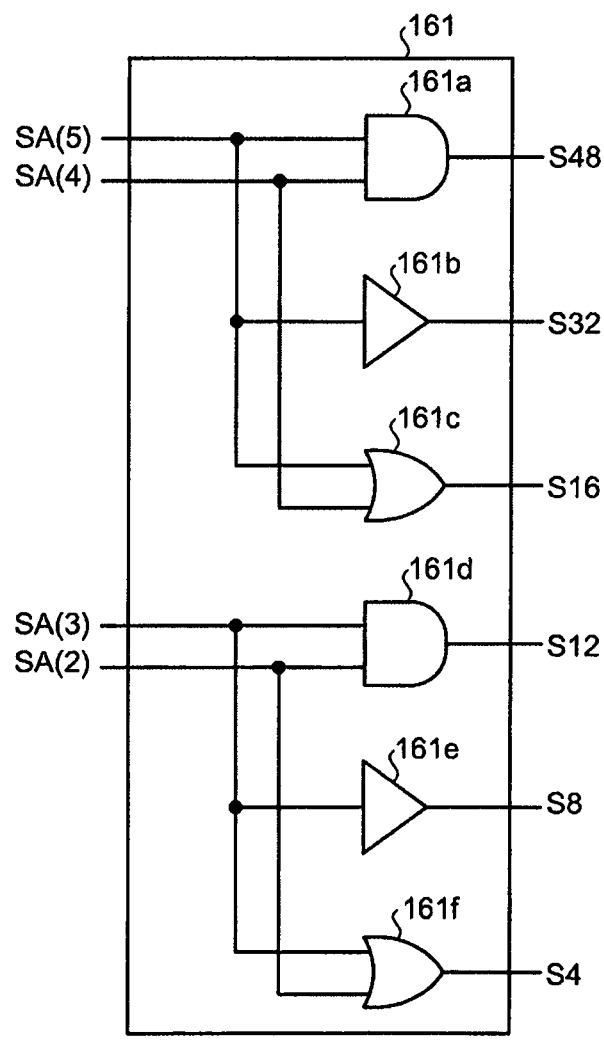
FIG. 5 is a schematic of a circuit structure of a shift amount sorting unit according to the first embodiment.

More specifically, the shift amount sorting unit 161 includes a circuit configuration, for example, as depicted in FIG. 5. In other words, the shift amount sorting unit 161 includes an AND gate 161a, a buffer 161b, an OR gate 161c, an AND gate 161d, a buffer 161e, and an OR gate 161f.

The AND gate 161a receives the high-order two bits of the SA (5:0) (in other words, the SA (5) and the SA (4)). If each of the two inputs is 1, the AND gate 161a outputs 1, and in any other event, the AND gate 161a outputs 0. That is, the AND gate 161a outputs a bit S48 that indicates whether the first left shifter 141 performs the shift by 48 bits.

The buffer 161b receives the highest-order bit of the SA (5:0) (in other words, the SA (5)). If the input is 1, the buffer 161b outputs 1, and if the input is 0, the buffer 161b outputs 0. That is, the buffer 161b outputs a bit S32 that indicates whether the first left shifter 141 performs the shift by an amount equal to or more than 32 bits.

The OR gate 161c receives the high-order two bits of the SA (5:0). If each of the two inputs is 0, the OR gate 161c outputs 0, and in any other event, the OR gate 161c outputs 1. That is, the OR gate 161c outputs a bit S16 that indicates whether the first left shifter 141 performs the shift by an amount equal to or more than 16 bits.

Similarly, the AND gate 161d receives the middle two bits of the SA (5:0) (in other words, the SA (3) and the SA (2)). If each of the two inputs is 1, the AND gate 161d outputs 1, and in any other event, the AND gate 161d outputs 0. That is, the AND gate 161d outputs a bit S12 that indicates whether the second left shifter 142 performs the shift by 12 bits.

The buffer 161e receives the SA (3) of the SA (5:0). If the input is 1, the buffer 161e outputs 1, and if the input is 0, the buffer 161e outputs 0. That is, the buffer 161e outputs a bit S8 that indicates whether the second left shifter 142 performs the shift by an amount equal to or more than eight bits.

The OR gate 161f receives the middle two bits of the SA (5:0). If each of the two inputs is 0, the OR gate 161f outputs 0, and in any other event, the OR gate 161f outputs 1. That is, the OR gate 161f outputs a bit S4 that indicates whether the second left shifter 142 performs the shift by an amount equal to or more than four bits.

Each of the bits S48, S32, S16, S12, S8, and S4 is 1 if it is true, and is 0 if it is false. With such a circuit configuration, the shift amount sorting unit 161 sorts out the shift amounts shifted by the first left shifter 141 and the second left shifter 142, based on the conditions being satisfied, by using the SA (5:0).

Referring back to FIG. 4, the mask generating unit 162 determines whether each of the blocks of four bits that forms the region 1 remains in the rounding region R (63:32) after being shifted to the left by the left shifter 140. The mask generating unit 162 generates a mask that is 1 for the block that remains in the rounding region R (63:32) after being shifted to the left, and that is 0 for the block that does not remain in the rounding region R (63:32) after being shifted to the left.

Figure 6:
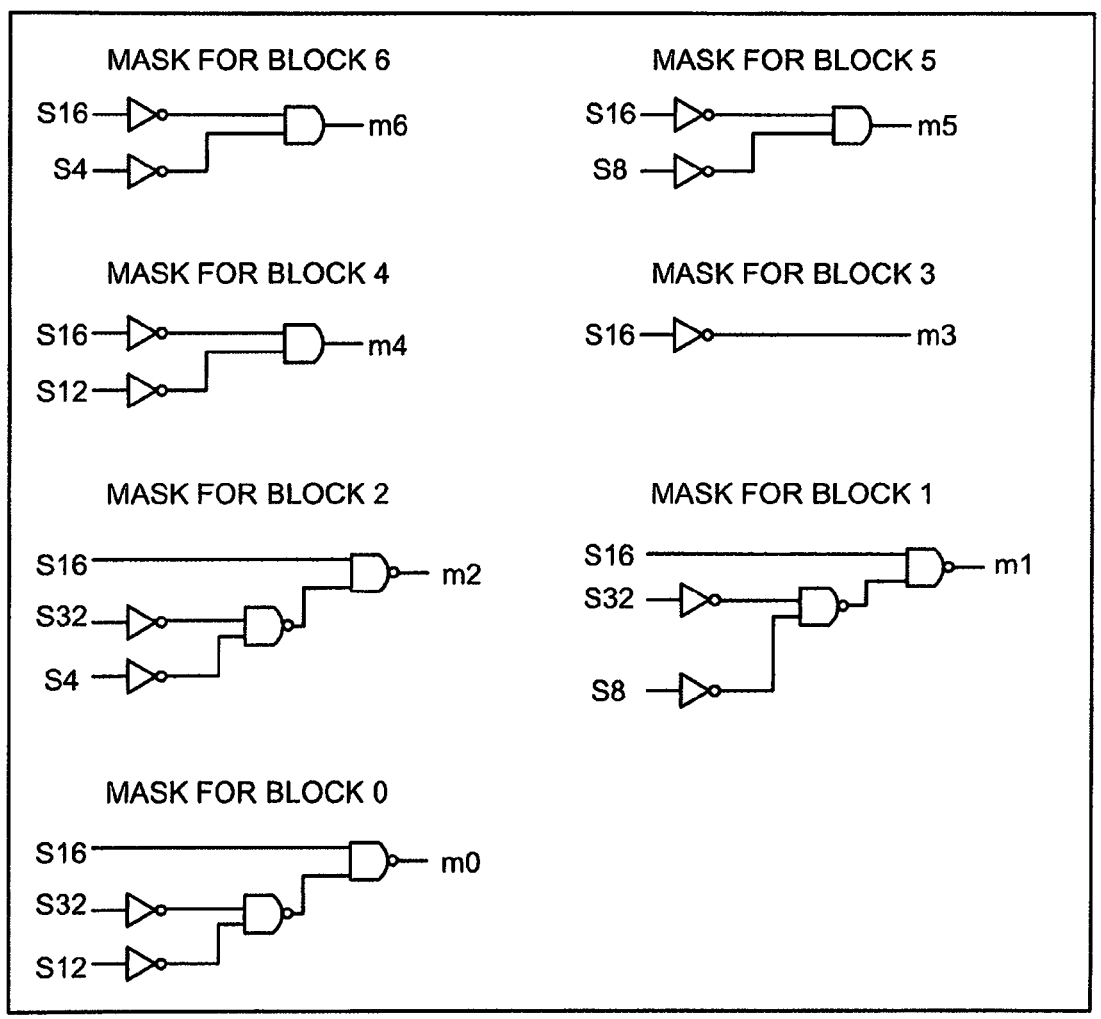
FIG. 6 is a schematic of a circuit structure of a mask generating unit according to the first embodiment.

More specifically, the mask generating unit 162, for example, includes a circuit as depicted in FIG. 6. The region 1 is formed by 28 bits of D (59:32), and includes seven blocks of four bits each. The blocks are arranged in a sequence of block 6, block 5, . . . , block 0, in descending order from the high-order block.

For example, regarding the block 6, if the left shift amount is equal to or less than four bits, the block 6 remains in the rounding region R (63:32) after being shifted to the left. Accordingly, if the amounts shifted by the first left shifter 141 and the second left shifter 142 are zero bits, regardless of the shift amount of the third left shifter 143, the block 6 will remain in the rounding region R (63:32). In other words, if an amount shifted by the first left shifter 141 is not equal to or more than 16 bits, and if an amount shifted by the second left shifter 142 is not equal to or more than four bits, the block 6 remains in the rounding region R (63:32) after being shifted to the left. If this is expressed by the bits S48, S32, S16, S12, S8, and S4 output from the shift amount sorting unit 161, if each of S16 and S4 is 0 (in other words, false), a circuit that outputs 1 can be obtained as a mask m6 for the block 6 as depicted in the diagram.

Similarly, regarding the block 5, if an amount shifted by the first left shifter 141 is not equal to or more than 16 bits, and if an amount shifted by the second left shifter 142 is not equal to or more than eight bits, the shift amount is seven bits at the most. Accordingly, the block 5 remains in the rounding region R (63:32). Consequently, if each of the reverses of S16 and S8 is 1 (in other words, if each of S16 and S8 is 0), a mask m5 for the block 5 is 1.

Regarding the block 4, if an amount shifted by the first left shifter 141 is not equal to or more than 16 bits, and if an amount shifted by the second left shifter 142 is not equal to or more than 12 bits, the shift amount is 11 bits at the most. Accordingly, the block 4 remains in the rounding region R (63:32). Consequently, if each of the reverses of S16 and S12 is 1 (in other words, if each of S16 and S12 is 0), a mask m4 for the block 4 is 1.

Regarding the block 3, if an amount shifted by the first left shifter 141 is not equal to or more than 16 bits, the shift amount is 15 bits at the most. Accordingly, the block 3 remains in the rounding region R (63:32). Consequently, if the reverse of S16 is 1 (in other words, if S16 is 0), a mask m3 for the block 3 is 1.

Regarding the block 2, if an amount shifted by the first left shifter 141 is not equal to or more than 16 bits, or if an amount shifted by the first left shifter 141 is 16 bits and an amount shifted by the second left shifter 142 is not equal to or more than four bits, the shift amount is 19 bits at the most. Accordingly, the block 2 remains in the rounding region R (63:32). Consequently, if S16 is 0, or if S16 is 1 and if each of the reverses of S32 and S4 is 1 (in other words, if each of S32 and S4 is 0), a mask m2 for the block 2 is 1.

Regarding the block 1, if an amount shifted by the first left shifter 141 is not equal to or more than 16 bits, or if an amount shifted by the first left shifter 141 is 16 bits and if an amount shifted by the second left shifter 142 is not equal to or more than eight bits, the shift amount is 23 bits at the most. Accordingly, the block 1 remains in the rounding region R (63:32). Consequently, if S16 is 0, or if S16 is 1 and if each of the reverses of S32 and S8 is 1 (in other words, if each of S32 and S8 is 0), a mask m1 for the block 1 is 1.

Regarding the block 0, if an amount shifted by the first left shifter 141 is not equal to or more than 16 bits, or if an amount shifted by the first left shifter 141 is 16 bits and if an amount shifted by the second left shifter 142 is not equal to or more than 12 bits, the shift amount is 27 bits at the most. Accordingly, the block 0 remains in the rounding region R (63:32). Consequently, if S16 is 0, or if S16 is 1 and if each of the reverses of S32 and S12 is 1 (in other words, if each of S32 and S12 is 0), a mask m0 for the block 0 is 1.

By using such a logic circuit, the mask generating unit 162 generates the masks m6 to m0 that are 1s if the blocks 6 to 0 remain in the rounding region R (63:32) after being shifted to the left, and that are 0s if the blocks 6 to 0 do not remain in the rounding region R (63:32) after being shifted to the left, from the bits S48, S32, S16, S12, S8, and S4.

Referring back to FIG. 4, by using each of the blocks that form the region 1 and the masks m6 to m0 generated for each of the blocks, the block determining unit 163 determines whether each of the four bits that form each of the blocks is 1.

Figure 7:
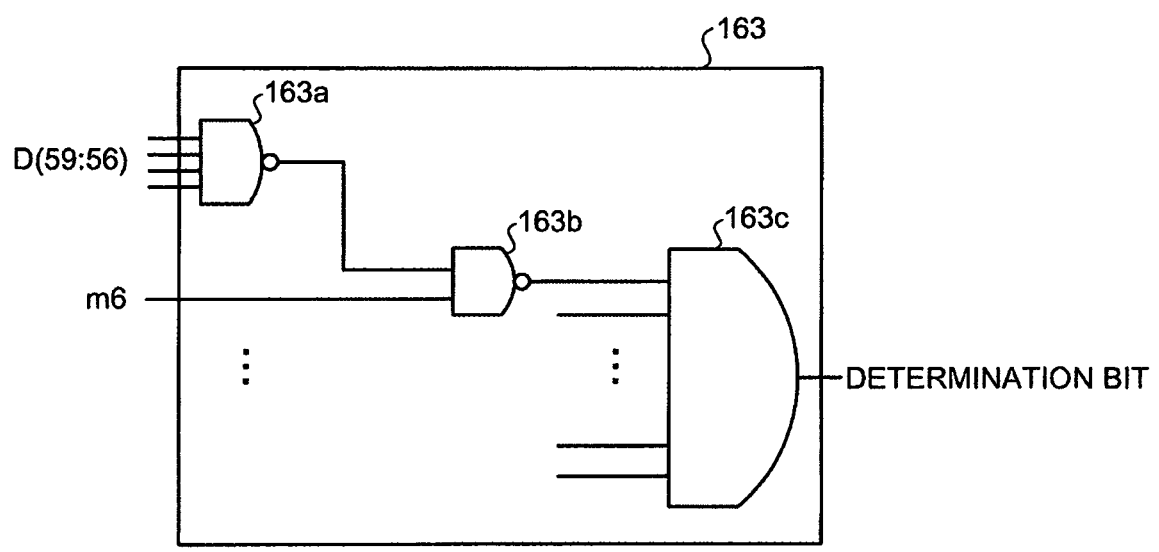
FIG. 7 is a schematic of a circuit structure of a block determining unit according to the first embodiment.

More specifically, the block determining unit 163, for example, includes a circuit configuration as depicted in FIG. 7. In other words, the block determining unit 163 includes NAND gates 163a, NAND gates 163b, and an AND gate 163c. Seven sets of the NAND gate 163a and the NAND gate 163a are provided corresponding to the blocks m6 to m0.

The NAND gates 163a each receive four bits that form each of the blocks. If each of the four inputs is 1, the NAND gate 163a outputs 0, and in any other event, the NAND gate 163a outputs 1. Accordingly, if zero is included in the four bits of the block, the NAND gate 163a outputs 1.

The NAND gates 163b each receives an output from their respective NAND gates 163a and the corresponding one of the masks m6 to m0 for each of the blocks. If each of the two inputs is 1, the NAND gate 163b outputs zero, and in any other event, the NAND gate 163b outputs 1. Accordingly, for the block whose mask is 0 and which does not remain in the rounding region R (63:32) after being shifted to the left, the NAND gate 163b always outputs 1. For the block whose mask is 1 and which remains in the rounding region R (63:32) after being shifted to the left, the NAND gate 163b outputs 0 if 0 is included in the four bits that form the block, and outputs 1 if each of the four bits is 1.

The AND gate 163c receives all the outputs from the NAND gates 163b. The AND gate 163c outputs 1 as a determination bit if each of the inputs is 1, and outputs 0 as a determination bit if 0 is included in any one of the inputs. In other words, if any one of the outputs of the NAND gates 163b corresponding to the blocks 6 to 0 is 0, the AND gate 163c outputs 0 as a determination bit. This means that if each of the masks m6 to m0 is 1 and there is a block in which any one of the four bits is 0, the AND gate 163c outputs 0 as a determination bit. Accordingly, if the determination bit output from the AND gate 163c is 0, 0 is included in the bits that remain in the rounding region R (63:32) after being shifted to the left, among the bits that form the region 1. Alternatively, if the determination bit output from the AND gate 163c is 1, each of the bits that remain in the rounding region R (63:32) after being shifted to the left among the bits that form the region 1 is 1.

The region 1 predicting unit that includes the shift amount sorting unit 161, the mask generating unit 162, and the block determining unit 163 predicts whether each of the bits that remain in the rounding region R (63:32) after being shifted to the left by the left shifter 140 among D (59:32) in the region 1 is 1, without fail. Similar to the region 1, the region 2 predicting unit predicts the region 2.

In other words, the shift amount sorting unit 164, similar to the shift amount sorting unit 161, sorts out the shift amounts specified by the first left shifter 141 and the second left shifter 142, by using the high-order four bits of the left shift amount SA (5:0) output from the LZ predictor 130. Because the shift amount sorting unit 164 has the same configuration as that of the shift amount sorting unit 161 (see FIG. 5), the descriptions thereof will be omitted. In FIG. 4, the shift amount sorting unit 161 and the shift amount sorting unit 164 are provided separately. However, the region 1 predicting unit and the region 2 predicting unit may commonly use one shift amount sorting unit.

The mask generating unit 165 determines whether each of the blocks of four bits that form the region 2 is shifted to the rounding region R (63:32) after being shifted to the left by the left shifter 140. The mask generating unit 165 generates a mask that is 1 for the block shifted to the rounding region R (63:32) after being shifted to the left, and that is 0 for the block not shifted to the rounding region R (63:32) after being shifted to the left.

Figure 8:
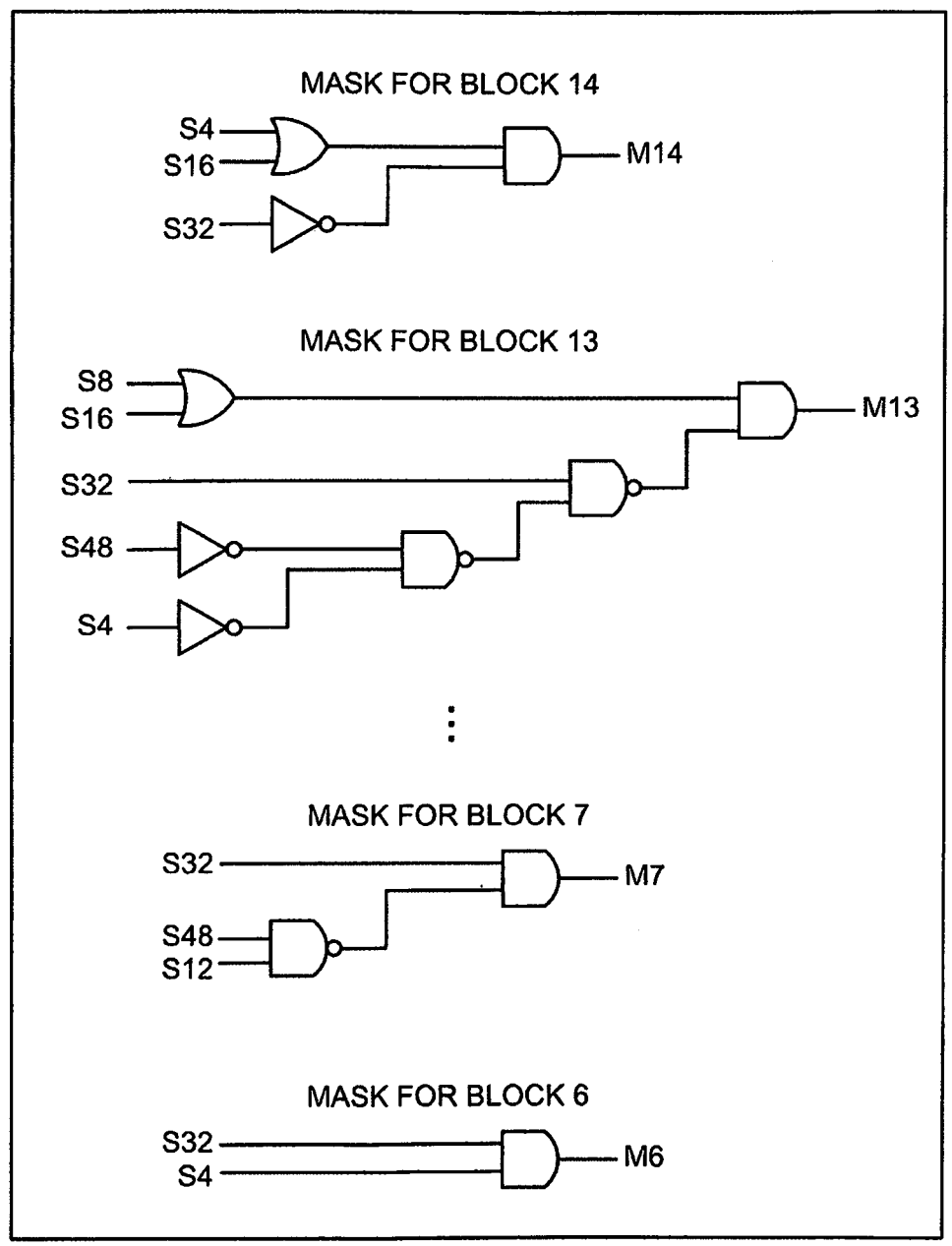
FIG. 8 is a schematic of a circuit structure of another mask generating unit according to the first embodiment.

More specifically, the mask generating unit 165 includes a circuit as depicted in FIG. 8. Because the region 2 is formed by 60 bits combined with D (31:0) and the padding area of 28 bits, thereby including 15 blocks of four bits each. The blocks are arranged in a sequence of block 14, block 13, . . . , block 0, in descending order from the high-order block. Each of the bits in the blocks 6 to 0 corresponding to the padding area is 0, and the blocks 6 to 0 are the same blocks.

For example, the block 14 is to be shifted to the rounding region R (63:32) after being shifted to the left, if the left shift amount is equal to or more than four bits and equal to or less than 32 bits. Accordingly, while taking into account the left shift performed by the third left shifter 143 by three bits at the most, the left shift amount by the first left shifter 141 and the second left shifter 142 should be equal to or more than four bits and equal to or less than 28 bits. In other words, if an amount shifted by the first left shifter 141 is zero bit and if an amount shifted by the second left shifter 142 is four bits, eight bits, or 12 bits, or if an amount shifted by the first left shifter 141 is 16 bits and an amount shifted by the second left shifter 142 is zero bit, four bits, eight bits, or 12 bits, the block 14 remains in the rounding region R (63:32) after being shifted to the left. If this is expressed by the bits S48, S32, S16, S12, S8, and S4 output from the shift amount sorting unit 164, a circuit that outputs 1 can be obtained as a mask M14 for the block 14 as depicted in the diagram, when at least one of S4 and S16 is 1 (in other words, true), and S32 is 0 (in other words, false).

Similarly, the block 13 remains in the rounding region R (63:32), if an amount shifted to the left is equal to or more than eight bits and equal to or less than 36 bits. Accordingly, a mask M13 should be one, if amounts shifted to the left by the first left shifter 141 and the second left shifter 142 are equal to or more than eight bits and equal to or less than 32 bits. The mask M13 is generated by the circuit depicted in FIG. 8.

Similarly, while taking into account the left shift performed by the third left shifter 143 by three bits at the most, the blocks 12 to 7 should generate masks M12 to M7 that are is at the left shift amount shifted to the left to D (59:32) of the region 1, by the first left shifter 141 and the second left shifter 142. The blocks 6 to 0 correspond to a padding area in which each of the bits is 0. Accordingly, if the block 6 is shifted to the left exceeding 32 bits, 0 derived from the padding area is always included in the rounding region R (63:32). Consequently, if a mask M6 that is 1 if the block 6 is shifted to the left by an amount equal to or more than 36 bits by the first left shifter 141 and the second left shifter 142, is generated, it is identified that 0 is included in the rounding region R (63:32) if the mask M6 is 1. Therefore, the blocks 5 to 0 need not be masked, and in the block determining unit 166, which will be described later, a determination may only be made, based on the determination results of the blocks 14 to 7 and the mask M6 for the block 6.

By using such a logic circuit, the mask generating unit 165 generates masks M14 to M6 that are is if the blocks 14 to 0 are shifted to the rounding region R (63:32) after being shifted to the left, and that are 0s if the blocks 14 to 0 are not shifted to the rounding region R (63:32) after being shifted to the left, from the bits S48, S32, S16, S12, S8, and S4.

The block determining unit 166, similar to the block determining unit 163, determines whether each of the four bits that form each of the blocks is 1, by using each of the blocks that form the region 2 and the masks M14 to M6 generated for each of the blocks. Because the block determining unit 166 has the same configuration as that of the block determining unit 163 (see FIG. 7), the descriptions thereof will be omitted.

The AND gate 167 receives the output from the block determining unit 163 and the output from the block determining unit 166, and outputs 1 as a predicted result if each of the two inputs is 1, and outputs 0 as a predicted result in any other event. In other words, the AND gate 167 outputs 1 as a predicted result, if each of the bits included in the rounding region R (63:32) shifted from the region 1 and the region 2 is 1.

The operation performed by the predicting unit 160 can be executed, if the outputs from the absolute value adder 120 and the LZ predictor 130 are obtained. Accordingly, the operation is executed in parallel with the left shift performed by the left shifter 140. Consequently, the predicting unit 160 predicts whether each of the bits excluding the high-order four bits (in other words, the region 3) and the low-order three bits (in other words, the region 4) in the rounding region R (63:32) after being shifted to the left, is 1.

Figure 9:
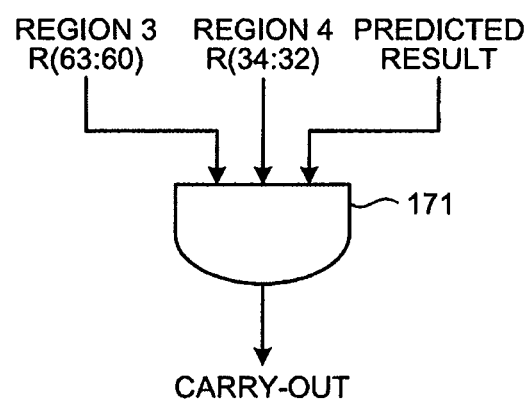
FIG. 9 is a schematic of an internal configuration of a CO detecting unit according to the first embodiment.

An internal configuration and an operation of the CO detecting unit 170 will now be described with reference to FIG. 9. As depicted in FIG. 9, the CO detecting unit 170 includes an AND gate 171 that receives R (63:60) of the region 3 and R (34:32) of the region 4 included in the normalized result R (63:0) output from the left shifter 140, and the bit of the predicted result obtained by the predicting unit 160.

In the present embodiment, the region 3 is four bits, the region 4 is three bits, and the predicted result is one bit. Accordingly, the AND gate 171 is an 8-input AND gate. The AND gate 171 outputs 1 if each of the eight inputs is 1.

As described above, the predicting unit 160 outputs 1 as a predicted result, if each of the bits excluding the bits of the region 3 and the region 4 in the rounding region R (63:32) is 1. Accordingly, by receiving the bits of the predicted result, the region 3, and the region 4, the AND gate 171 outputs 1 if each of the bits that form the rounding region R (63:32) is 1. In other words, the AND gate 171 outputs 1 when each of the bits in the rounding region R (63:32) obtained after being shifted to the left by the left shifter 140 is 1, and if a carry-out is generated by incrementing during rounding performed by the rounding unit 150.

Accordingly, the CO detecting unit 170 obtains the same result to that obtained by a 32-input AND operation of the rounding region R (63:32) after being shifted to the left by the left shifter 140, using the 8-input AND operation, thereby detecting a carry-out. As a result, the generation of a carry-out due to the rounding of floating point numbers can be determined quickly, thereby speeding up the computation. The detected carry-out is output to a processing unit for processing an exponent, which is not depicted, and the exponent is incremented by 1, as much as the carry-out.

Figure 10:
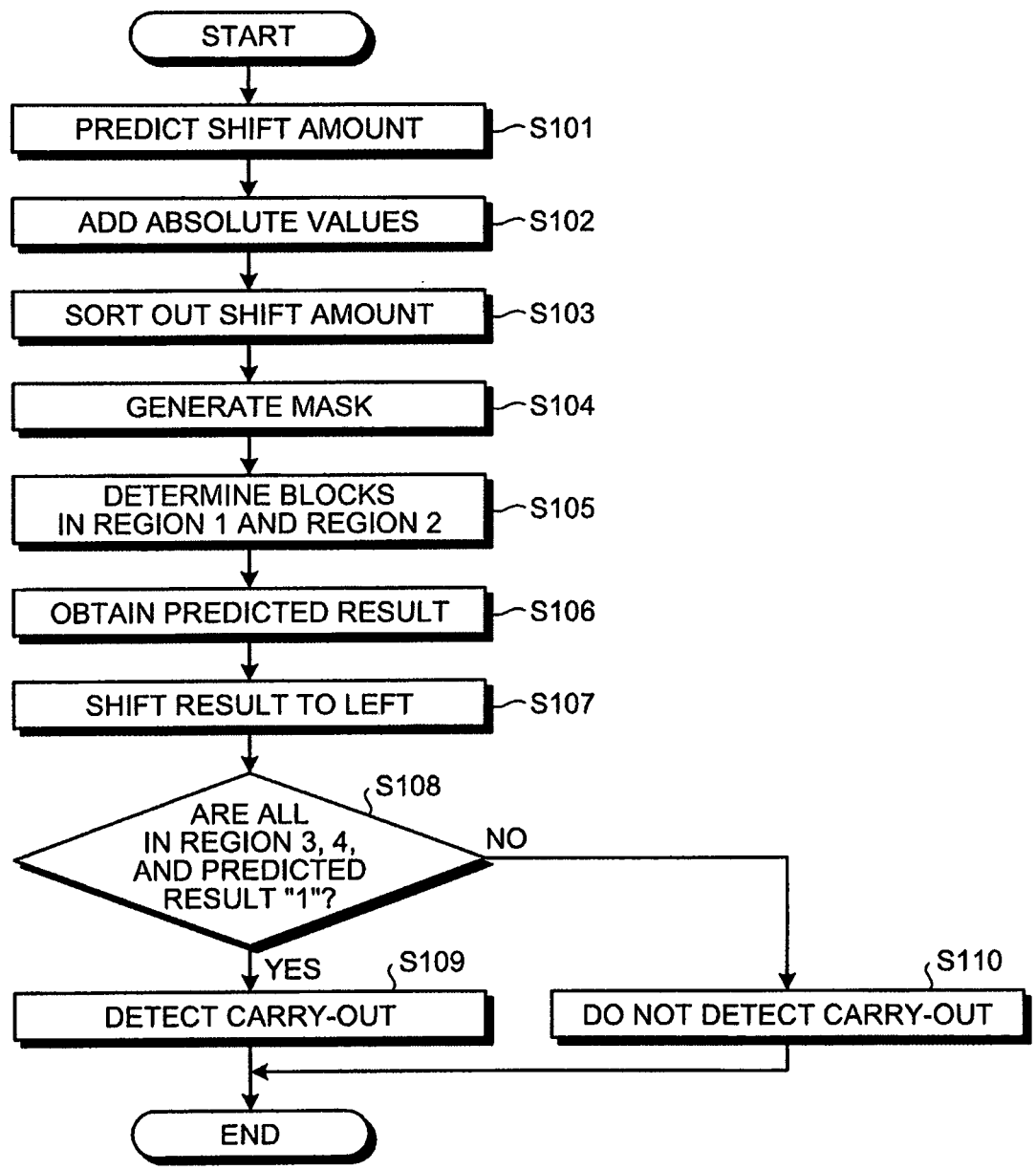
FIG. 10 is a flowchart of a procedure for predicting whether a carry-out is generated according to the first embodiment.

The operation for detecting the carry-out described above is summarized by referring to a flowchart depicted in FIG. 10. The explanation will be made by focusing mainly on the operations of the predicting unit 160 and the CO detecting unit 170.

The absolute value adder 120 and the LZ predictor 130 receive the operand OP1 aligned by being shifted to the right by the right shifter 110 and the operand OP2. The LZ predictor 130 predicts the number of the leading zeros of the computation result obtained by the absolute value adder 120, and predicts the shift amount (Step S101). The predicted shift amount SA (5:0) is output to the left shifter 140 and the predicting unit 160.

At the same time, the absolute value adder 120 adds the absolute values (Step S102), and the computation result D (63:0) is output to the left shifter 140 and the predicting unit 160.

When the predicting unit 160 receives the shift amount SA (5:0), the shift amount sorting unit 161 and the shift amount sorting unit 164 calculate bits S48, S32, S16, S12, S8, and S4 that indicate the classification of the shift amounts by four bits, by using the high-order four bits of the shift amount SA (5:0) (Step S103, see FIG. 5).

The mask generating unit 162 and the mask generating unit 165 generate a mask for each of the blocks of four bits that form the region 1 and the region 2, by using the bits S48, S32, S16, S12, S8, and S4 (Step S104, see FIGS. 6 and 8). Each of the masks is 1 for the block included in the rounding region R (63:32) after being shifted to the left by the left shifter 140, and is 0 for the block not included in the rounding region R (63:32), among the blocks that form the region 1 and the region 2.

After masks for all the blocks that form the region 1 and the region 2 are generated, the block determining unit 163 and the block determining unit 166 determine whether each of the four bits included in their respective blocks is 1. Then the mask for each of the blocks is applied to the determination result, and if each of the bits in the blocks included in the rounding region R (63:32) after being shifted to the left, among the blocks that form the region 1 and the region 2, is 1, the block determining unit 163 and the block determining unit 166 each output 1 as a determination bit (Step S105, see FIG. 7).

The determination bit outputs from the block determining unit 163 and the block determining unit 166 are received by the AND gate 167, and if each of the determination bits for the region 1 and the region 2 is 1, 1 is output as a predicted result obtained by the predicting unit 160. If the predicted result is 1, it indicates that each of the bits included in the rounding region R (63:32) derived from the region 1 and the region 2 is 1. The predicted result is output to the CO detecting unit 170 from the predicting unit 160, and obtained by the CO detecting unit 170 (Step S106).

In parallel with predicting the region 1 and the region 2, the left shifter 140 shifts the computation result D (63:0) obtained by the absolute value adder 120 to the left, thereby obtaining the normalized result R (63:0) (Step S107). The high-order four bits of the normalized result R (63:0) are the region 3, and the low-order three bits of the rounding region R (63:32) are the region 4. The normalized result R (63:0) by the left shifter 140 is received by the CO detecting unit 170, and the CO detecting unit 170 determines whether each of the bits in the region 3, the region 4, and the predicted result is 1 (Step S108).

More specifically, the AND gate 171 in the CO detecting unit 170 receives seven bits of the region 3 and the region 4, and one bit of the predicted result obtained by the predicting unit 160, and if each of the input eight bits is 1, 1 is output, and if 0 is included in any one of them, 0 is output (see FIG. 9). At this time, if each of the eight bits received by the AND gate 171 is 1 (YES at Step S108), each of the bits that form the rounding region R (63:32) is 1. Accordingly, a carry-out is detected (Step S109) and the carry-out 1 is output from the AND gate 171. If 0 is included in any one of the eight bits received by the AND gate 171 (NO at Step S108), 0 is included in the bits that form the rounding region R (63:32). Accordingly, a carry-out is not detected (Step S110).

In this manner, according to the present embodiment, whether each of the bits in the block predicted to be included in the mantissa after the normalization shift, among the blocks of four bits that form the computation result obtained by adding absolute values is 1 is determined, at the time when a shift amount for normalization is obtained. Then, after the actual normalization shift, whether a carry-out is generated by incrementing during rounding is determined, from the high-order four bits and the low-order three bits corresponding to the mantissa, and the predicted result of the block. Accordingly, the generation of a carry-out can be detected by the AND operation with a smaller number of stages, without performing the AND operation on all the bits that form the mantissa after the normalization shift. Consequently, the generation of a carry out due to the rounding of floating point numbers can be determined quickly, thereby speeding up the computation.

[b] Second Embodiment

Features of a second embodiment according to the present invention are to apply the present invention to the double-precision floating point numbers in IEEE 754.

In IEEE 754, as depicted in FIG. 11, a single-precision floating point number format and a double-precision floating point number format are defined. In other words, as depicted in the upper stage of FIG. 11, the mantissa is 23 bits in the single-precision floating point number format, but as depicted in the lower stage of FIG. 11, the mantissa is 52 bits in the double-precision floating point number format. Accordingly, to determine whether each of the bits of the mantissas is 1 from the normalized result obtained by the normalization shift, AND operations of 52-bit, which is a massive number, needed to be performed.

Figure 12:
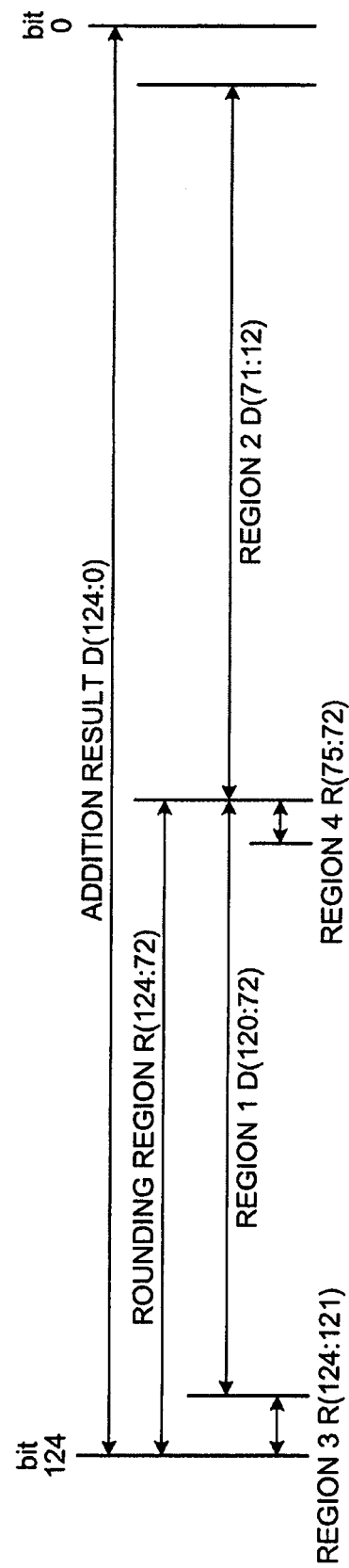
FIG. 12 is a schematic of a region of bit positions according to a second embodiment.
Figure 13:
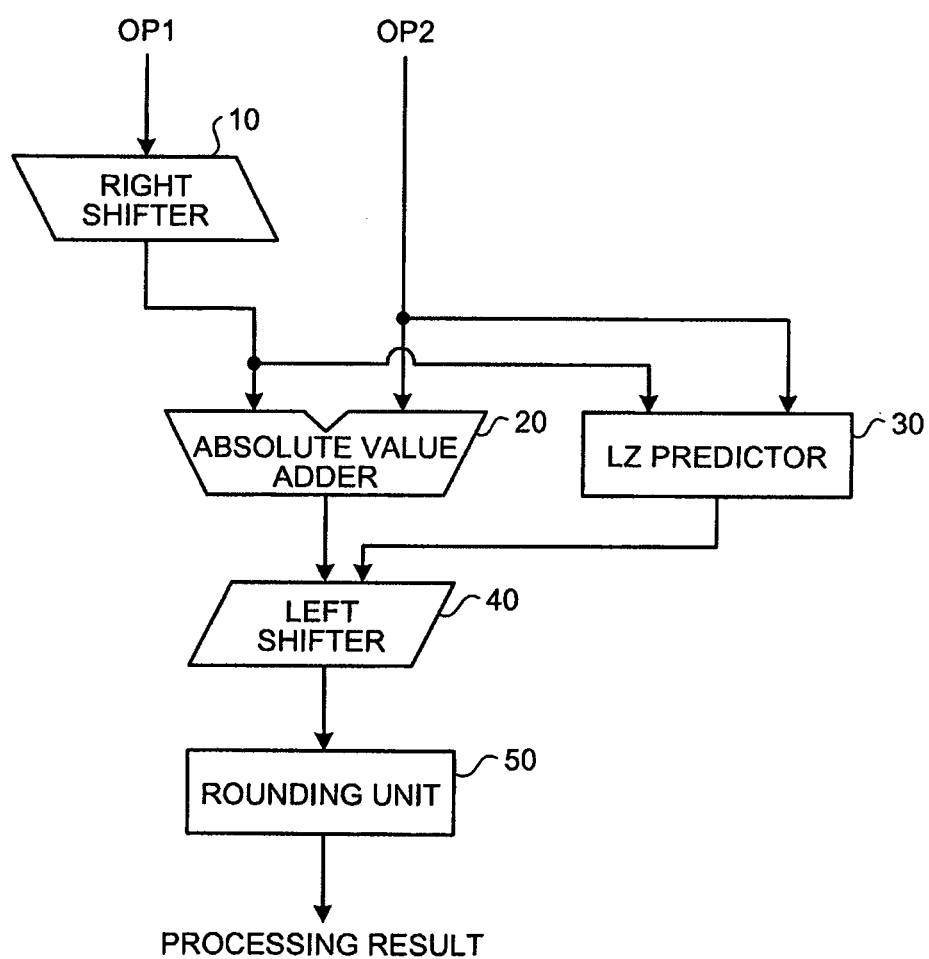
FIG. 13 is a block diagram of a structure of a processing unit that processes the mantissa of a floating point number of a computation processor.
Figure 14:
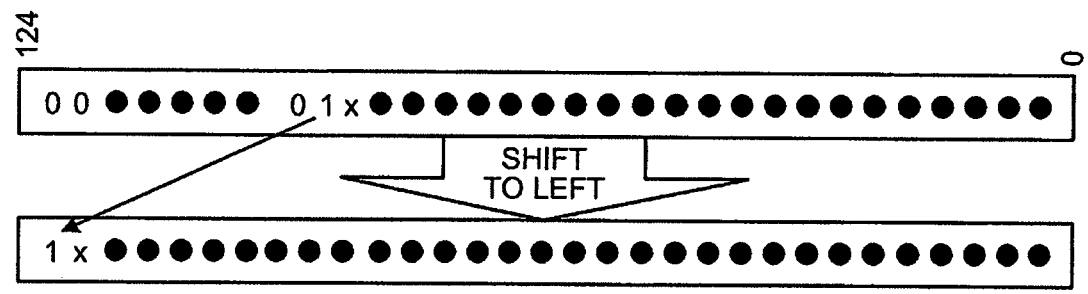
FIG. 14 is a schematic of an example of normalization by shifting to the left.

In the present invention, regions 1 to 4 are set as depicted in FIG. 12, and whether each of the bits in the block shifted to the mantissas of the region 1 and the region 2 is 1 is determined, at the time when the shift amount of the normalization shift is predicted. Then, whether each of the 52 bits of the mantissa is 1 is determined, by AND operating the eight bits of the region 3 and the region 4, and the one bit of the predicted result.

Because the key portion of the computation processor according to the present embodiment is the same as that of the computation processor depicted in FIG. 1, the descriptions thereof will be omitted. However, as depicted in FIG. 12, in the present embodiment, because a computation result D (124:0) obtained by the absolute value adder 120 is 125 bits, the left shifter 140 shifts the computation result D (124:0) by about 128 bits. Consequently, the shift amount predicted by the LZ predictor 130 is expressed by seven bits. The left shifter 140 includes a first left shifter that shifts the computation result by zero bit or 64 bits based on the highest-order bit of the shift amount, a second left shifter that shifts the computation result by zero bit, 16 bits, 32 bits, or 48 bits, based on the second and the third bits from the high-order shift amount, a third left shifter that shifts the computation result by zero bit, four bits, eight bits, or 12 bits, based on the fourth and the fifth bits from the high-order shift amount, and a fourth left shifter that shifts the computation result by zero bit, one bit, two bits, or three bits, based on the two bits of low-order shift amount. In the following description, an operation performed after the first left shifter has shifted by zero bit or 64 bits will be considered.

An error of one bit at the most may occur, when the leading zeros are predicted by the LZ predictor 130. Accordingly, the left shifter 140 includes a 1-bit shifter that sets the first bit to 1 without fail, at the subsequent stage of the fourth left shifter. The 1-bit shifter refers to the result of the left shift performed by the fourth left shifter, and outputs an output of the fourth left shifter if the first bit is 1. If the first bit is 0, the 1-bit shifter shifts the output of the fourth left shifter further to the left by one bit, and outputs the result.

Referring back to FIG. 12, the setting of the region in the present embodiment will now be described. In the present embodiment, if the addition result of D (124:0) obtained by the absolute value adder 120 is referred to, the rounding region after being normalized by the left shifter 140 is expressed by 53 bits of R (124:72) in which 1 is added to the mantissa of 52 bits. The region 1 is D (120:72) in which the highest-order four bits are excluded from the high-order 53 bits of the addition result D (124:0), and the region 2 is D (71:12) subsequent to the region 1 of the addition result D (124:0). In the present embodiment, unlike the first embodiment, a padding area is not necessary.

The region 3 is the high-order four bits R (124:121) of the rounding region R (124:72) after being normalized, and the region 4 is the low-order four bits R (75:72) of the rounding region R (124:72) after being normalized. In the present embodiment, a prediction error of one bit obtained by the LZ predictor 130 is also taken into account. Accordingly, the present embodiment also corresponds to when the region 3 and the region 4 are four bits, and the 1-bit shifter of the left shifter 140 shifts the output to the left by additional one bit, due to the prediction error obtained by the LZ predictor 130. As a result, the number of bits in the region 1 is 49 bits and is not the multiples of four. However, the eventual computation amount of the AND operation in the CO detecting unit 170 is increased, corresponding to the increase in size of the region 3. Accordingly, in the present embodiment, the number of bits in the region 1 is left to 49 bits.

Similar to the first embodiment, the regions are used for predicting the generation of a carry-out. In other words, whether the region 1 remains in the rounding region R (124: 72) after being normalized is determined, and whether the region 2 is shifted to the rounding region R (124:72) after being normalized is determined. If each of the bits included in the rounding region R (124:72) of the region 1 and the region 2 is 1, and if each of the bits in the region 3 and the region 4 is 1, each of the bits in the rounding region R (124:72) is 1. Accordingly, a carry-out is generated by incrementing during rounding.

In other words, similar to the first embodiment, in the present embodiment also, the predicting unit 160 predicts whether each of the blocks of four bits that form the region 1 and the region 2 is included in the rounding region R (124:72) after being normalized by the left shifter 140. The predicting unit 160 then outputs the predicted result that indicates whether all the bits of the blocks included in the rounding region R (124:72) are one. Because the internal configuration of the predicting unit 160 according to the present embodiment is similar to that of the predicting unit 160 of the first embodiment (see FIG. 4), the descriptions thereof will be omitted.

However, in the present embodiment, the region 1 is 49 bits. Accordingly, the mask generating unit 162 generates masks for the total of 13 blocks including 12 blocks of four bits each and a block of one bit, and the block determining unit 163 performs determination.

In the present embodiment, because the region 1 is 49 bits, when each of the blocks that forms the region 2 is shifted by four bits, a bit shifted from the region 2 may be included in the first bit of the region 1. Accordingly, the block determining unit 166 determines whether each of the four bits that form the block and one bit immediately before the block is 1, for the blocks that form the region 2. In other words, in the block determining unit 166 according to the present embodiment, a 5-input NAND gate is used instead of the NAND gate 163a depicted in FIG. 7. At this time, one bit immediately before the highest-order block in the region 2 is included in the region 1, and is separately determined by the block determining unit 163. Accordingly, similar to the first embodiment, a 4-input NAND gate may be exclusively used for the highest-order block in the region 2.

Similar to the first embodiment, the predicting unit 160 outputs 1 as a predicted result, if each of the bits included in the rounding region R (124:72) shifted from the region 1 and the region 2 is 1. The operation performed by the predicting unit 160 can be executed, after the outputs from the absolute value adder 120 and the LZ predictor 130 are obtained. Accordingly, the operation is performed in parallel with the left shift performed by the left shifter 140. Consequently, the predicting unit 160 predicts whether each of the bits excluding the high-order four bits (in other words, the region 3) and the low-order four bits (in other words, the region 4) of the rounding region R (124:72) after being shifted to the left, is 1.

Similar to the first embodiment, if each of the four bits of the region 3 and the four bits of the region 4 obtained after being shifted to the left by the left shifter 140 and the one bit of the predicted result obtained by the predicting unit 160 is 1, the CO detecting unit 170 detects the generation of a carry-out, and outputs 1. That is, the CO detecting unit 170 obtains the same result obtained by a 53-input AND operation of the rounding region R (124:72) after being shifted to the left by the left shifter 140, by a 9-input AND operation, and detects a carry-out.

In this manner, according to the present embodiment, whether each of the bits in the block predicted to be included in the mantissa after the normalization shift, among the blocks of four bits that form the computation result of the absolute value addition is 1 is determined, at the time when the shift amount for normalization is obtained. Then, after the actual normalization shift, whether a carry-out is generated by incrementing during rounding is determined, from the high-order four bits and the low-order four bits corresponding to the mantissa, and the predicted result of the block. Accordingly, the generation of the carry-out can be detected by the AND operation with a small number of stages, without performing the AND operation on all the bits that form the mantissa after the normalization shift. Consequently, the generation of a carry-out due to the rounding of floating point numbers can be determined quickly, and the computation can be speed up, even for the double-precision floating point number in IEEE 754.

In the embodiments, whether the region 1 and the region 2 are included in the rounding region after being shifted to the left is predicted, for the left shift by four bits. However, the prediction may be made by other units instead of the four bits. In other words, if a shift amount by a plurality of bits is identified from a part of a bit string that indicates the shift amount of the normalization shift, a prediction may be made on the blocks that form the region 1 and region 2 by the bits. In this case, the sizes of the region 3 and the region 4 may be appropriately changed, based on the number of bits that is a unit for the shift amount.

In short, in the present invention, the region 1 and the region 2 are regions that may be included in the rounding region by the normalization shift of the computation result, and whether the regions are included in the rounding region is predicted from the shift amount of the normalization shift, and whether each of the bits is 1 is also determined simultaneously with the normalization shift. The first and the last few bits of the rounding region are the region 3 and the region 4, respectively, and whether each of the bits in the regions is 1 is determined after the normalization shift. By summarizing the determinations, it is possible to predict whether a carry-out is generated during rounding, by performing the AND operations on a few bits corresponding to the region 3 and the region 4.

In the embodiments, the processing result obtained by the rounding unit 150 can be stored in a storage unit such as a memory, and used for information processing performed by an information processor and the like.

According to the present invention, computing is performed; a shift amount of a computation result is calculated; the computation result is normalized by using the shift amount; when the computation result is shifted by an amount equal to or more than a predetermined shift amount by using the shift amount, it is predicted whether each of bits in a predetermined region of a shift result is 1, in parallel with the normalization; and a generation of a carry-out is detected by receiving a normalized result and a predicted result. Accordingly, the generation of a carry-out can be detected in parallel with the normalization, without waiting for the output of the normalized result. Consequently, the generation of the carry-out due to the rounding can be determined quickly, thereby speeding up the computation.

According to the present invention, the detection is performed by using any one of the normalized result and the predicted result or both, based on the shift amount. Accordingly, if the normalized result is used, the generation of the carry-out can be detected more accurately, and if the predicted result is used, the generation of the carry-out can be detected more quickly.

According to the present invention, computing is performed; a shift amount of a floating point computation result is calculated; a computation result is normalized by shifting the computation result in a range of a predetermined shift amount; it is predicted whether each of bits in a predetermined region of a floating point computation result shifted by an amount equal to or more than the predetermined shift amount, by using the shift amount, is 1, in parallel with the normalization; and the generation of a carry-out is detected by receiving a normalized result and a predicted result. Accordingly, the generation of a carry-out can be detected in parallel with the normalization, without waiting for the output of the normalized result. Consequently, the generation of the carry-out due to the rounding of floating point numbers can be determined quickly, thereby speeding up the computation.

According to the present invention, because a plurality of shifters that shifts a computation result in different shift amount ranges is included, the computation result can be shifted gradually. Accordingly, a rough bit position after being shifted is determined at an early stage.

According to the present invention, a bit width of $4^n$ (n is a positive integer) is shifted corresponding to the bit position of the shift amount. Accordingly, by combining gradual shifts, all the shifts that can be expressed by the bits of the shift amount can be realized.

According to the present invention, a predetermined region of the floating point computation result is a first region in which the highest-order "a" bit is excluded from the high-order "n" bits of the floating point computation result ("n" and "a" are positive integers), and a second region that is the low-order "m" bits of the floating point computation result, and that is shiftable to the first region by a shifting process performed in a range of a predetermined shift amount ("m" is a positive integer). Accordingly, for a rough shift amount other than a dense shift amount corresponding to the a bit, it is possible to specify a range to which the bits of the floating point computation result are shifted, and predict whether each of bits included in a predetermined range after being shifted is 1.

According to the present invention, a floating point computation is performed; a shift amount of a floating point computation result is calculated; the floating point computation result is normalized by including a plurality of shifters, and gradually shifting the floating point computation result by the shifters, by using the shift amount; it is predicted, by using the shift amount, whether each of bits of the shifted results of a first region that remains in the mantissa by being shifted by an amount equal to or more than a predetermined shift amount, and of a second region shifted to the mantissa by the amount equal to or more than the predetermined amount, is 1, in the normalization; a third region that remains in the mantissa by being shifted less than the predetermined shift amount in the normalized result, a fourth region shifted to the mantissa by being shifted less than the predetermined shift amount in the normalization shift amount, and a predicted result are received; and the generation of a carry-out is detected. Accordingly, the generation of a carry-out can be detected from the predicted result of whether each of bits of the first region and the second region predicted to be included in the mantissa by the normalization is 1, and a third region and a fourth region included in the mantissa after the actual normalization. The generation of the carry-out can be detected by a small processing amount after the normalization, by predicting the first region and the second region in parallel with the normalization.

According to the present invention, the first region is a region in which the highest-order "a" bit is excluded from the high-order "n" bits of the floating point computation result; the second region is a region that is the low-order "m" bits of the floating point computation result, and that is shiftable to the first region by the shifting process performed in a range of a predetermined shift amount; the third region is a region of the highest-order "a" bit of the floating point computation result, and the fourth bit is a region of the lowest-order "b" bit in the first region ("a", "b", "m", and "n" are positive integers). Accordingly, a processing amount for detecting a carry-out executed after the normalization by using the predicted result on the first region and the second region, the third region, and the fourth region, can be made small, by increasing the sizes of the first region and the second region, and reducing the sizes of the third region and the fourth region.

According to the embodiments, pieces of data obtained by dividing the first region or the second region by the predetermined shift amount are received; it is detected whether each of bits in the input data is 1; masking is performed on the detected outputs by using the shift amounts corresponding to the divided pieces of data; and an AND operation is performed on the outputs. Accordingly, it is determined whether each of the bits of the required data is 1, while masking the data that will not be included in the predetermined region after being normalized. Consequently, accurate predictions on the first region and the second region can be executed.

According to the embodiments, it is detected that each of bits of the first region to the fourth region is 1, by incrementing an exponent of the floating point computation result, the result to which the exponent of the computation result is incremented by 1, is output as the exponent of the floating point computation result after being rounded. Accordingly, a carry-out generated by computing the mantissa can be reflected on the exponent, and the accurate computation result of the floating point numbers that meets, for example, IEEE 754 standards can be obtained.

According to the embodiments, computing is performed; a shift amount of a computation result is calculated; the computation result is normalized by using the shift amount; it is predicted whether each of bits in a predetermined region of the computation result after being normalized is 1 by using the shift amount, in parallel with the normalization; the generation of a carry-out is detected by receiving a normalized result and a predicted result; the computation result is rounded; and the output is stored therein. Accordingly, the generation of a carry-out can be detected in parallel with the normalization, without waiting for the output of the normalized result. Consequently, for example, the present invention can be used as an information processor that rounds the computation result and stores therein the processing result.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computation processor comprising:
   a computing unit that performs floating point computation of a plurality of input values each of which includes a plurality of bits;
   a shift amount calculating unit that calculates a shift amount of a result of the floating point computation obtained by the computing unit;
   a normalizing unit that includes a plurality of shifting units, and that, by using the shift amount, performs normalization of the result of the floating point computation, by performing a stepwise shift using the shifting units;
   a rounding unit that performs rounding on a result of the normalization by the normalizing unit:
   a predicting unit that, by using the shift amount and in parallel with the normalization, predicts whether each of bits of a first region having a potential of not remaining in a target region of the rounding by being shifted by an amount equal to or more than a predetermined shift amount corresponding to one of the shifting units, and of a second region having a potential of being shifted into the target region of the rounding by being shifted in the normalization performed by the normalizing unit, is included in the target region of the rounding after the normalization, and determines whether all of bits predicted to be included in the target region of the rounding are 1; and
   a detecting unit that receives a third region having highest-order bits as many as or less than the predetermined shift amount in the result of the normalization, a forth region having lowest-order bits as many as or less than the predetermined shift amount in the target region of the rounding, and a determination result obtained by the predicting unit to detect a generation of the carry-out by adding 1 to the result of the normalization in the rounding.

2. The computation processor according to claim 1, wherein each of the shifting units is a shifting unit that performs a shift by a bit width of $4^n$ (n is a positive integer) corresponding to a bit position of the shift amount.

3. The computation processor according to claim 1, wherein the first region is a region in which a most significant "a" bit is excluded from a highest-order "n" bit of the result of the floating point computation,
   the second region is a region that is a lowest-order "m" bit of the result of the floating point computation and that is shiftable to the target region of the rounding,
   the third region is a region of the most significant "a" bit of the result of the normalization, and
   the fourth region is a region of a least significant "b" bit in the target regio of the rounding in the result of the normalization ("a", "b", "m", and "n" are positive integers).

4. The computation processor according to claim 1, wherein the predicting unit includes:
   a plurality of first AND units that receives data obtained by dividing the first region or the second region by the predetermined shift amount, and detects whether each of bits of input data is 1;
   a plurality of masking units that masks each output of the first AND units, by using a shift amount corresponding to each piece of the divided data; and
   a second AND unit that performs AND operation on an output from the masking units.

5. A computing method comprising:

performing floating point computation of a plurality of input values each of which includes a plurality of bits;

calculating a shift amount of a result of the floating point computation obtained;

performing normalization of the result of the floating point computation by performing a stepwise shift, by using the shift amount;

performing rounding on a result of the normalization;

predicting, by using the shift amount and in parallel with the normalization, whether each of bits of a first region having a potential of not remaining in a target region of the rounding by being shifted by an amount equal to or more than a predetermined shift amount, and of a second region having a potential of being shifted into the target region of the rounding by being shifted in the normalization, is included in the target region of the rounding after the normalization, and determining whether all of bits predicted to be included in the target region of the rounding are 1; and receiving a third region having highest-order bits as many as or less than the predetermined shift amount in the result of the normalization, a forth region having lowest-order bits as many as or less than the predetermined shift amount in the target region of the rounding, and a determination result obtained by the predicting unit to detect a generation of the carry-out by adding 1 to the result of the normalization in the rounding.

* * * * *

UNITED STATES PATENT AND TRADEMARK OFFICE
CERTIFICATE OF CORRECTION

| | |
|---|---|
| PATENT NO. | : 8,554,819 B2 |
| APPLICATION NO. | : 12/461338 |
| DATED | : October 8, 2013 |
| INVENTOR(S) | : Kunihiko Tajiri |

Page 1 of 1

It is certified that error appears in the above-identified patent and that said Letters Patent is hereby corrected as shown below:

In the Claims

In Column 18, Line 18, In Claim 1, delete "unit:" and insert -- unit; --, therefor.
In Column 18, Line 34, In Claim 1, delete "forth" and insert -- fourth --, therefor.
In Column 18, Line 55, In Claim 3, delete "regio" and insert -- region --, therefor.
In Column 19, Line 23, In Claim 5, delete "forth" and insert -- fourth --, therefor.

Signed and Sealed this
Twenty-fourth Day of December, 2013

Margaret A. Focarino
*Commissioner for Patents of the United States Patent and Trademark Office*